M. G. DE SIMONE

VARIABLE OSCILLATION CONDENSER

April 5, 1932. Re. 18,405

Original Filed Nov. 6, 1924

INVENTOR,

Michele Guglielmo de Simone,

BY

Henry J. Lucke,

His ATTORNEY.

Reissued Apr. 5, 1932 Re. 18,405

UNITED STATES PATENT OFFICE

MICHELE GUGLIELMO DE SIMONE, OF STAPLETON, NEW YORK

VARIABLE OSCILLATION CONDENSER

Original No. 1,718,538, dated June 25, 1929, Serial No. 748,281, filed November 6, 1924. Application for reissue filed January 17, 1931. Serial No. 509,514.

This invention relates to variable condensers and particularly of the radio frequency and other oscillation types.

Pursuant to my invention, variation in capacitance is attained by the regulation of the dielectric interposed between the plates of the rotor and stator of the condenser combined with the regulation of the extent of common effective area between the rotor and stator plates.

My invention is applicable to the rotary types of variable condensers whereby upon rotation of the rotor shaft regulation of the capacitance is attained jointly by variation of the interposed dielectric and of the common effective areas of the rotor and stator plates by the imposed rotary movement combined with an axially displaced movement of the rotor shaft controlled by a cam or equivalent. My invention is also applicable to condensers of the mechanically push and pull type, operated usually by a manually operated member, whereby upon linearly pushing the movable condenser plate or plates, the capacitance is regulated by the imposed linear movement combined with an arcuate movement controlled by a cam or the like and corresponding linear and arcuate movements in the opposite movement by pulling the manually operated member.

Pursuant to one preferred form of my invention as applied to the imposed rotary types of condenser, the rotor plate or plates are mounted upon a common shaft in the desired spaced relation to one another and the axial movement of such shaft controlled by a cam or equivalent having an effective cam face conforming to the desired variation of axial displacement relative to rotary displacement. A simple form of cam face for such axial displacement cam is that of a constant pitch.

A further feature of my invention is the adjustment of the capacitance of a condenser at its minimum or maximum or intermediate setting by mounting a cam or other member for controlling the movement of the movable condenser blades, adjustably on the rotor shaft or linear displacement rod.

While my invention is particularly advantageous in radio frequency and other oscillation condensers of the variable type, it will be perceived that my invention is also useful in variable condensers of general use in alternating and other forms of variable electrical currents.

Further features and objects of the invention will be more fully understood from the following detail description and the accompanying drawings, in which.

Figure 1:
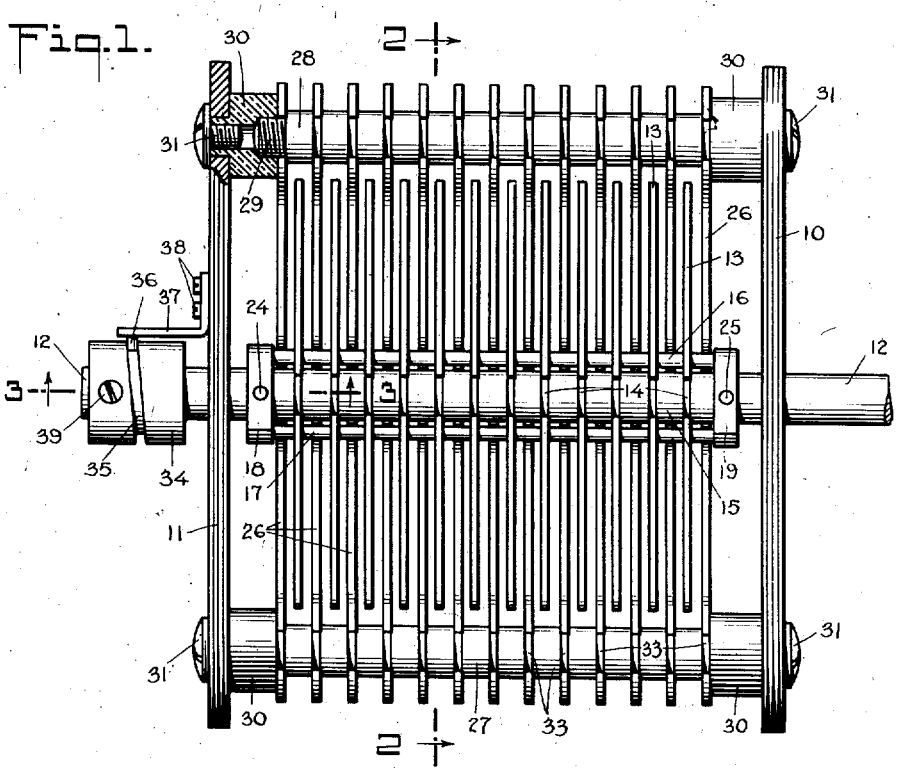
Figure 1 is a top plan view of a rotary condenser embodying my invention.
Figure 2:
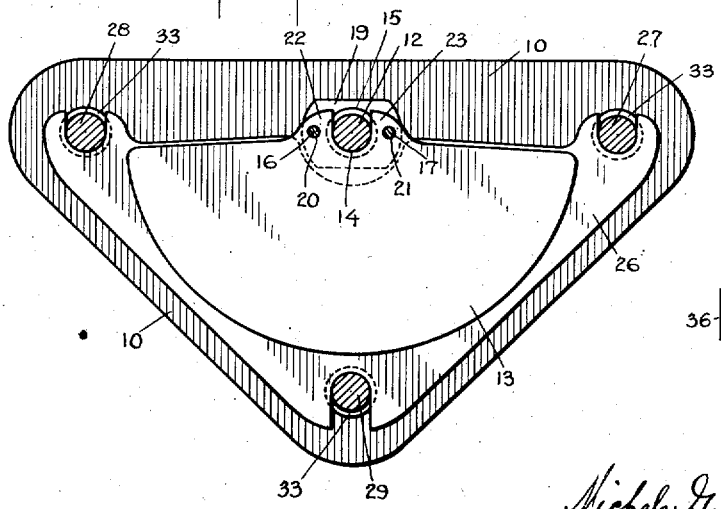
Figure 2 is a sectional elevation on line 2—2 of Figure 1.
Figure 3:
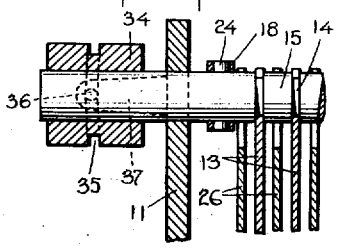
Figure 3 is a sectional elevation on line 3—3 of Figure 1.

Referring to Figures 1, 2 and 3, the frame of the condenser comprises the front frame plate 10 and rear frame plate 11, provided with suitable registering openings for rotatably receiving the rotor shaft 12. In the usual condenser, such shaft 12 is not insulated from the frame plates 10, 11, but if desired insulation may be had by the use of bushings of fibre or other insulating material, as will be understood.

The rotor plates 13 are secured to the rotor shaft 12 in any approved manner, but I prefer to position each rotor plate on the rotor shaft by reducing the diameter of the shaft 12 at the locations 14, 14, corresponding in number to that of the rotor plates, to thereby form annular grooves alternately disposed between relatively raised annular rings 15. The securement of each rotor plate within its groove 14 on the shaft 12 may be had in any approved manner, and advantageously by the provision of the retaining rods 16, 17 disposed on opposite sides of the shaft 12 and each anchored at its one end within a suitable opening in the end block 18 and their opposite ends anchored in corresponding openings in the opposite end block 19; such rods 16, 17 respectively pass through the registering openings 20, 21 in the ears 22, 23 of the respective rotor plates 13. The end block 18 is adjustably positioned on the shaft 12 by means of a set screw 24 and similarly the end block 19 by means of its set screw 25.

Such annular grooves 14 on the rotor shaft 12 are most accurately and most expeditiously cut by means of gang cutter blades in a screw machine, whereby the width of each groove is accurate within a one-half of one thousandth of an inch or less of the thickness of each rotor plate at its mounting opening about its ears 22, 23. Such method of mounting attains far greater uniformity of spacing and certainty of retention as compared with the heretofore use of collars cut of the small length corresponding to the spacing of the rotor plates and threading the same on the rotor shaft.

On the opposite sides of the rotor plates 13 are arranged the stator plates 26 which are usually insulatedly mounted. I have indicated three rods 27, 28, 29 symmetrically arranged within suitable openings in the front frame plate 10 and registering openings in the rear frame plate 11. Such rods, see rod 28, Figure 1, may be of metal and insulated from the frame plate 11 by tapping its end 29 within the spacer 30 of suitable insulating material, held at its opposite end by means of the screw 31 threaded in the bushing portion 32 of the insulating spacer 30. A similar form of insulating spacer 30 is employed at the opposite end of the rod 28 and similarly at both ends of each of the rods 27, 29; like reference numbers designate similar parts.

I prefer to space and secure the stator plates 26 on their respective mounting rods 27, 28, 29, similarly to that described hereinabove for mounting the rotor plates 13 on the rotor shaft 12. The grooves 33 are cut at the locations corresponding to the spacings of the stator plates 26 and of a width corresponding to the thicknesses of the end portions of each stator plate 26, as by means of gang cutter blades operated in a screw machine or the like. By reason of the stator plates 26 being mounted between their three supporting rods 27, 28, 29, retaining rods of the nature of the aforesaid rods 20, 21 are not necessary, but may be employed. The assembly of the stator plates 26 on and between their supporting rods 27, 28, 29 is most simply attained by slipping each stator plate, see Fig. 2, in its groove 33 of each of the rods 27, 28, 29 while the rods 27, 28, 29 are loosely held in either one of the frame plates 10, 11, that is to say, having the screws 31 not fully tightened and thereafter fully tightening the screws 31 in both frame plates 10, 11, or the equivalent procedure.

Such form of spacing and retention of the stator plates 26, in addition to the advantages set forth above relative to the similar mounting of the rotor plates, insures against all distortion of any of the rods 27, 28, 29 or other displacement of any stator plate 26 on any of the rods 27, 28, 29, due to unequal or undue tightening up of the rods in the frame plates 10, 11, a fault most commonly experienced in the use of collars loosely mounted on shafts and serving to space the condenser plates from one another.

The control of the longitudinal or axial displacement of the shaft 12 upon rotation of the same is readily effected by means of a cam 34 and having an effective cam face as in the form of a slot 35, the pitch of which may be constant or varied as may be desired. Cooperating with such cam face 35 is arranged a cam pin 36 mounted on a suitable bracket 37, suitably supported as by means of the screws 38 tapped into the frame plate 11.

The shaft 12 may be operated manually as by means of a suitable dial or finger piece or by any other approved means or may be actuated by means of a pulley driven by a cord or belt or by any other approved form of mechanical means.

The cam 34 or equivalent is preferably adjustably mounted on the shaft 12, as by forming the cam as a collar making a loose fit at its inner opening with the shaft 12 and positioning the cam 34 by means of its set screw 39 passing through a suitable opening in the cam 34 and frictionally or otherwise engaging the shaft 12.

Such form of the cam 34, or equivalent, affords adjustment of setting of the cam 34 axially of the shaft 12 and also arcuately of the cam 34 relative to the shaft 12. By the axial adjustment of the cam 34, the capacitance of the condenser is set for the maximum value or any intermediate value below the maximum value of capacitance as may be preferred or desired. By the arcuate adjustment of the cam 34, the variation of the capacitance is set as desired for the particular extent or extents of arcs of rotational movement of the rotor plates relative to the stator plates.

By the use of the condenser set forth hereinabove, it will be observed that upon rotation of the shaft 12 the rotor plates 13 are moved through an arc corresponding to the arc of rotation imposed on the shaft 12 thereby varying the common effective areas between the rotor plates and the stator plates and simultaneously therewith through an axial or longitudinal displacement of the shaft 12, thereby varying the interposition of dielectric between the rotor plates and the stator plates.

By forming the groove 35 of the cam 34, or equivalent, with a zero pitch, the variation of capacitance is constant and dependent upon the arc of rotation solely, and my invention affords the regulation of the capacitance by the adjustment of the cam 34, or equivalent, on the rotor shaft.

In a similar manner, my invention is adapted for use of mechanical push and pull types of variable condensers, namely upon linear displacement of the shaft, a cam controls the arcuate displacement of such shaft and thereby simultaneously varying the dielectric interposed between the movable fixed plates and the condenser and the extent of another area. Such form of condenser advantageously comprises a disk mounted on the movable shaft, plates arranged radially on such disk and serving as the movable condenser plates and projecting alternately between similar plates mounted on another disk suitably stationarily supported.

Condensers embodying my invention are applicable in use with circuits of all types, and the adjustment afforded by a cam or equivalent embodied in my invention enables the rotor plates to be set to attain increased stability particularly at the critical values of capacitance, such as the capacitance values approaching the minimum, at which stage the extent of interposition of the dielectric is increased and the common effective area greatly enlarged as compared with condensers as heretofore constructed. In such forms of condensers embodying my invention, the maximum capacitance may be attained by locating the rotor plates more closely toward the stator plates.

Whereas I have described my invention by reference to specific forms thereof, it will be understood that many changes and modifications may be made without departing from the spirit of the invention.

Having thus described my invention, what I claim is:

1. In an electrical condenser of the variable type, the combination of a set of rotor plates, rotary means for supporting and rotating said rotor plates, a set of stator plates, and adjustable cam means for controlling the extent of displacement of said rotor plates axially of said rotary supporting means incident to the rotation of said rotor plates, said cam means comprising a cam element adjustably carried by said rotary supporting means.

2. In an electrical condenser of the variable type, the combination of a set of rotor plates, a shaft for supporting and rotating said rotor plates, a set of stator plates, and adjustable cam means for controlling the extent of displacement of said rotor plates axially of said shaft incident to the rotation of said rotor plates, said cam means comprising a cam element adjustably carried by said shaft.

3. In an electrical condenser of the variable type, the combination of a set of rotor plates, a shaft for supporting and rotating said rotor plates, a set of stator plates, and adjustable cam means for controlling the extent of displacement of said rotor plates axially of said shaft incident to the rotation of said rotor plates, said cam means comprising a cam element adjustably carried by said shaft, said cam element having a cam groove and a pin cooperating with said cam groove.

4. In an electrical condenser of the variable type, the combination of a frame, a set of stator plates mounted in said frame, a shaft, a set of rotor plates carried by said shaft, and adjustable cam means for controlling the extent of displacement of said rotor plates axially of said shaft incident to the rotation of said rotor plates, said adjustable cam means comprising a cam element adjustably carried by said shaft, and a cooperating cam element carried by said frame.

5. In an electrical condenser having a group of stator plates and a cooperating group of rotor plates and means for varying irregularly the relative lateral position of the groups of plates as the rotor is turned.

6. In an electrical condenser having a group of stator plates and a cooperating group of rotor plates and means for shifting the rotor plates laterally in any irregular manner as the rotor is turned.

7. In an electrical condenser having a group of stator plates and a cooperating group of rotor plates and means for causing the rotor plates to follow any predetermined irregular lateral motion as it is turned.

8. In an electrical condenser having a group of stator plates and a cooperating group of rotor plates with means for rotatably adjusting the angular position between the stator and rotor plates and independent means for automatically and irregularly changing the relative lateral position of said groups of plates for obtaining maximum and minimum capacity curves and also an intermediate variable curve.

9. In an electrical condenser having cooperative groups of plates, having relative adjustment therebetween, means for varying irregularly the relative lateral position of the groups as said adjustment is being made.

10. An electrical condenser having cooperative groups of plates with relative adjustment therebetween, means for varying irregularly the relatively lateral position of at least one plate of the said groups as said adjustment is being made.

In testimony whereof, I affix my signature.

MICHELE GUGLIELMO DE SIMONE.